US005650870A

United States Patent [19]
Kaino et al.

[11] Patent Number: 5,650,870
[45] Date of Patent: Jul. 22, 1997

[54] ROTARY POLYGON MIRROR

[75] Inventors: Kazuyuki Kaino, Hirakata; Yosuke Ogue, Amagasaki, both of Japan

[73] Assignee: Matsushita Electronic Industrial Co., Ltd., Osaka-fu, Japan

[21] Appl. No.: 636,650

[22] Filed: Apr. 23, 1996

Related U.S. Application Data

[62] Division of Ser. No. 260,238, Jun. 14, 1994, Pat. No. 5,561,545.

[30] Foreign Application Priority Data

Dec. 15, 1992 [JP] Japan ................... 4-334287

[51] Int. Cl.⁶ ................................. G02B 26/08
[52] U.S. Cl. ................. 359/216; 359/850; 359/855
[58] Field of Search ............... 359/216–219, 359/846, 848, 850, 857, 871–872, 876, 855

[56] References Cited

U.S. PATENT DOCUMENTS

| 4,892,372 | 1/1990 | Chonan et al. ............ 359/217 |
| 5,361,170 | 11/1994 | Takeyasu ................ 359/850 |

FOREIGN PATENT DOCUMENTS

| 57-29004 | 2/1982 | Japan. |
| 60-217328 | 10/1985 | Japan. |

Primary Examiner—James Phan
Attorney, Agent, or Firm—Wenderoth, Lind & Ponack

[57] ABSTRACT

A rotary polygon mirror has reflecting mirror faces formed at side faces of a prism of a predetermined height, and includes an axially symmetrical projection formed along at least parts of outer peripheral edges of the prism on upper and lower faces of the prism.

4 Claims, 3 Drawing Sheets

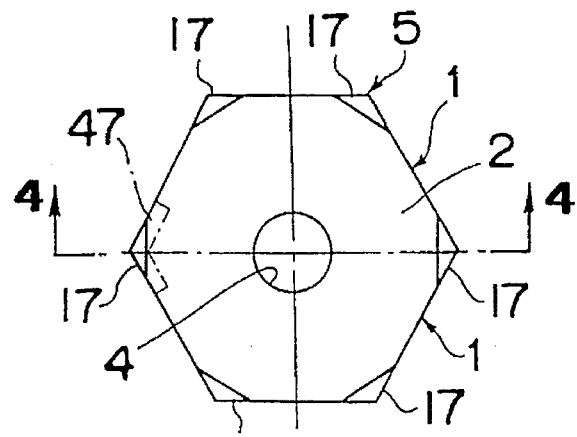
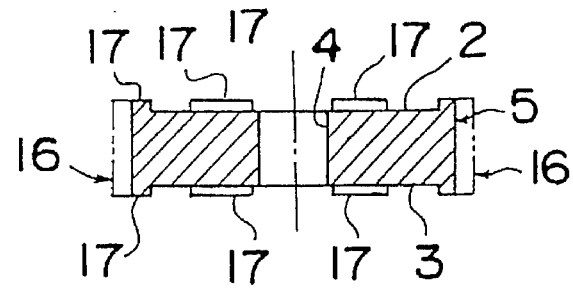
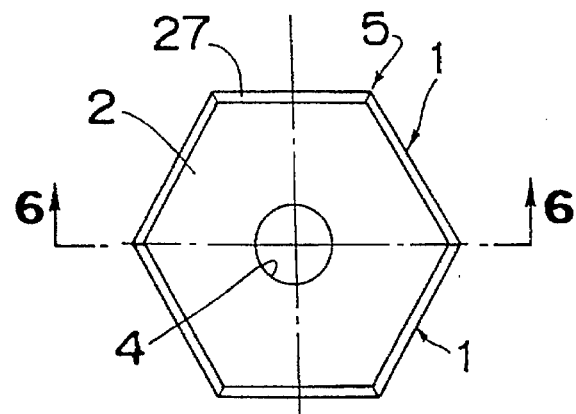
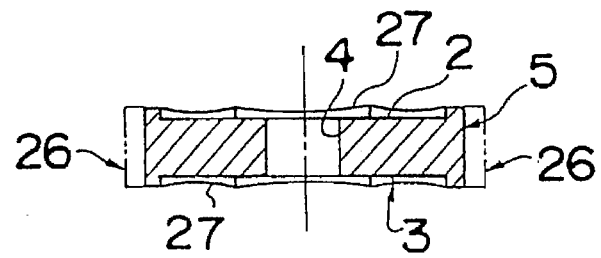

ROTARY POLYGON MIRROR

This is a divisional application of Ser. No. 08/260,238, filed Jun. 14, 1994, now U.S. Pat. No. 5,561,545.

BACKGROUND OF THE INVENTION

The present invention relates to a rotary polygon mirror which is used in an optical mechanism of a copying apparatus, a facsimile apparatus, etc.

A conventional rotary polygon mirror is in the shape of a prism with a plurality of side faces 1, an upper face 2 and a lower face 3 in the predetermined thickness, as shown in FIGS. 7 and 8. A reflecting mirror face formed at the side face 1 is fixed to a rotary shaft through a mounting hole 4 penetrating the center of the upper and lower faces 2 and 3.

The flatness of the reflecting mirror face of the rotary polygon mirror is particularly important. Since the polygon mirror is rotated at high speeds when in use, i.e., 3,000–15,000 rpm, the side face 1 or a vertex 5 is outwardly expanded by centrifugal force during use. As plotted by a phantom line in FIG. 8, however, the amount of the deformation or expansion 36 generated at this time differs depending on the position of the side face 1 or the vertex 5 in the heightwise direction of the prism, leading to the distortion D of the side face 1 or the vertex 5. The amount of the distortion D is the difference between the maximum and minimum values of the amount of the deformation in a direction of a normal on a line of intersection of the effective reflecting range of the reflecting mirror face formed at the side face 1 with a plane including the rotary shaft.

It is necessary to lessen the above-described distortion D because the distortion D degrades the accuracy of the optical mechanism. For this purpose, the side face 1 can be provided with a specific curved surface to negate the distortion D in the stationary state and form a plane when deformed during the rotation.

The rotary polygon mirror can have various kinds of angles in the shape of a prism, and moreover, due to the hole 4 formed for the rotary shaft to penetrate the center of each face 2, 3, the distance from the center of rotation becomes different depending on the position of the hole 4 in the peripheral direction on the side face 1. Moreover, the distance between the outer circumference of the hole 4 and the side face 1 is different depending on the position of the hole 4 in the peripheral direction on the side face 1. Therefore, the scale of centrifugal force acting on the side face 1 and the degree of the expansion of the side face 1 are varied depending on the position on the side face 1 in the peripheral direction about the hole 4, causing the amount of the deformation of the side face 1 to be varied in a complex manner at various parts of the side face 1. As such, in the above-described method to negate the distortion, the surface of a mold for forming the side face 1 is required to be processed into a complicated surface, and the process is difficult, with much time and cost consumed.

SUMMARY OF THE INVENTION

The object of the present invention is therefore to provide a rotary polygon mirror which can be manufactured by a processing method not requiring a complicated processing of a mold surface and for which the distortion generated during the rotation thereof is restricted.

In accomplishing these and other objects, according to one aspect of the present invention, there is provided a rotary polygon mirror having reflecting mirror faces formed at side faces of a prism of a predetermined height, comprising an axially symmetrical projection axial-symmetrically formed along at least parts of each outer peripheral edge of upper and lower faces of the prism.

When the rotary polygon mirror is rotated at high speeds of 3,000–15,000 rpm, the side face with the reflecting mirror face is expanded by the centrifugal force and distortion is brought about. The reason for the distortion is that although the central part in the heightwise direction of the side face is influenced by the centrifugal force from both upper and lower sides thereof because of the presence of the constitutional parts of the rotary polygon mirror there, the upper and lower faces of the prism in touch with the air receive the centrifugal force from one side, and therefore the amount of deformation in the vicinity of the upper and lower faces is less, resulting in a difference in the amount of deformation between the central part and, the upper and lower faces of the prism.

The distortion becomes different depending on the shape of the prism, the distance from the center of rotation to the side face, the rotating frequency, the density or rigidity, etc. of the material and the like. At the same time, the ratio of the length of each side of the prism to the diameter of the hole affects the amount of distortion. If the distortion at the edge is larger than that of the side face, and vice versa, the amount of distortion which is the difference of the maximum and minimum values of the amount of deformation in a direction of a normal on a line of intersection between the effective reflecting range of the reflecting mirror face of the side face and a plane including the rotary shaft is calculated from the rotating frequency, the density and rigidity or the shape of the material. The calculated result is coincides well coincident with the actually-measured value.

Accordingly, if the rotary polygon mirror is shaped so that the additional centrifugal force acts on the peripheral edges of the upper and lower faces to thereby make equal the amount of deformation between the vicinity of the upper and lower faces and at the central part in the heightwise direction of the side face, the amount of deformation in the vicinity of the upper and lower faces is increased, and the flatness of the side face is controlled so as to not be deteriorated. In other words, a heavy-weight projection is provided at the peripheral edges of the upper and lower faces where the amount of distortion is large, while a light-weight projection is formed at the peripheral edges of the upper and lower faces where the amount of distortion is small. It is needless to say that no projection is needed at the peripheral edges of the upper and lower faces when the amount of distortion is such that it need not be corrected.

Accordingly, the rotary polygon mirror of the present invention has a reflecting mirror face formed at the side face of the prism of a predetermined height, and projections are provided along the whole outer peripheral edges of the upper and lower faces of the prism or partly along the outer peripheral edges of the upper and lower faces of the prism. Therefore, the centrifugal force acting on the projections when the rotary polygon mirror is rotated is additionally supplied to the peripheral edges of the upper and lower faces of the prism. Owing to the added centrifugal force, the amount of deformation in the direction of a normal of the peripheral edges becomes large, making the amount of deformation at the peripheral edges of the upper and lower faces of the prism close to that of the central part of the side face in the heightwise direction. The amount of distortion is eventually reduced.

BRIEF DESCRIPTION OF THE DRAWINGS

These and other objects and features of the present invention will become clear from the following description taken in conjunction with the preferred embodiments thereof with reference to the accompanying drawings, in which:

FIGS. 3 and 4 are a plan view, and a sectional view along the line 4—4, of a rotary polygon mirror according to a second embodiment of the present invention;

FIGS. 5 and 6 are a plan view, and a sectional view along the line 6—6, of a rotary polygon mirror according to a third embodiment of the present invention.

DETAILED DESCRIPTION OF THE PREFERRED EMBODIMENTS

Figure 1:
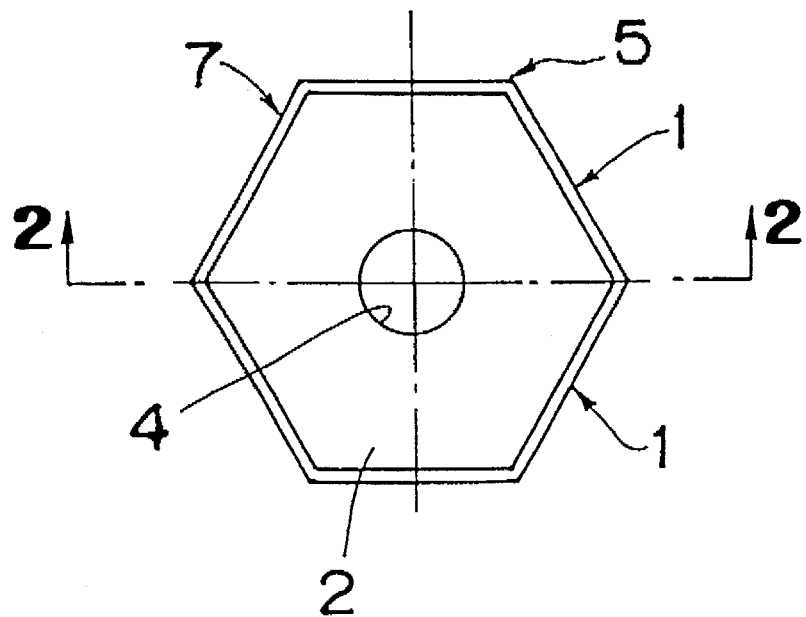
FIGS. 1 and 2 are a plan view, and a sectional view along the line 2—2, of a rotary polygon mirror according to a first embodiment of the present invention.

Before the description of the present invention proceeds, it is to be noted that like parts are designated by like reference numerals throughout the accompanying drawings.

The present invention will be depicted in detail with reference to FIGS. 1–6 hereinbelow.

Figure 2:
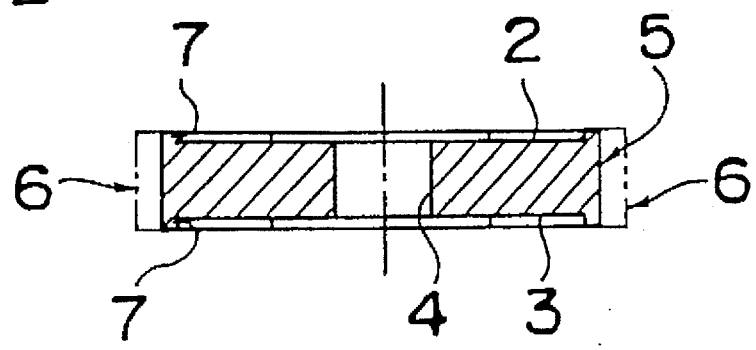
Figure 7:
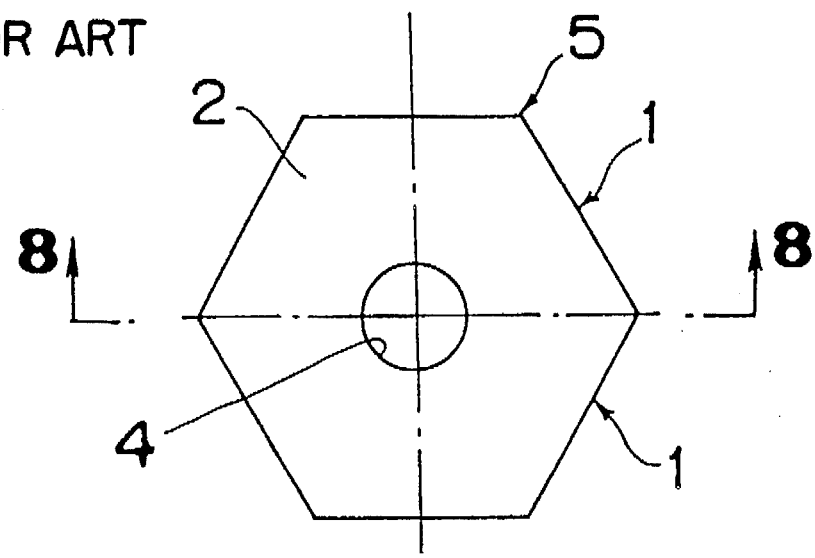
FIGS. 7 and 8 are a plan view, and a sectional view along the line 8—8, of a conventional rotary polygon mirror.
Figure 8:
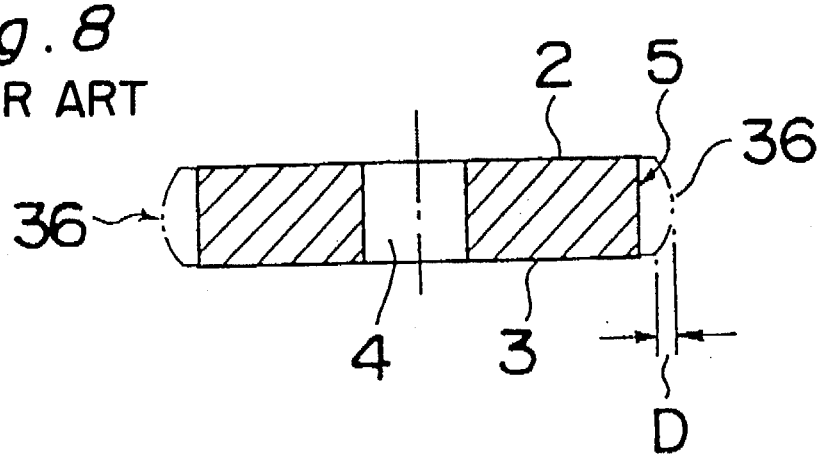

In a rotary polygon mirror, according to a first embodiment of the present invention shown in FIGS. 1 and 2, the amount of deformation in the whole periphery of a side face 1 of the mirror is generally uniformly increased. The rotary polygon mirror is formed of polycarbonate in the shape of a hexagonal prism, having a uniform projection 7 along the whole periphery of each of an upper face 2 and a lower face 3 thereof. The projection 7 is a hexagonal frame, and its section can have the shape of a trapezoid, triangle, rectangle, semicircle, etc., and the heights of the projections 7 on the upper and lower faces 2, 3 of the prism preferably are the same as each other and the widths of the projections 7 on the upper and lower faces 2, 3 of the prism preferably are the same as each other, in order to provide the effects described below. That is, the inner and outer peripheral faces of the projections 7 are preferably in parallel. For example, in the embodiment of FIGS. 1 and 2, the side face 1 of the hexagonal prism where a reflecting mirror face is formed is 20 mm long, the projection 7 is 0.3 mm high and 1 mm wide. The height of the hexagonal prism not including the projection 7 is 4 mm.

Since the projection 7 is provided as in the first embodiment, centrifugal force works on the projection 7 when the rotary polygon mirror is rotated, and moreover is applied as an additional centrifugal force to the periphery of the upper and lower faces 2 and 3. As a result of this, upper and lower parts of the side face 1 in touch with the peripheries of the upper and lower faces 2 and 3 are deformed greatly, thereby reducing the difference of the amount 6 of deformation between the upper and lower parts and the central part of the side face 1 in the heightwise direction which is positioned between the upper and lower parts of the side face 2. The distortion of the side face 1 and a vertex 5 is thus decreased. The resultant deformation or expansion 6 is shown in FIG. 2.

A rotary polygon mirror according to a second embodiment shown in FIGS. 3 and 4 is effective when the amount of distortion is different at points of the side faces 1 in the peripheral direction, i.e., the amount of distortion of a pair of the side faces 1 in the vicinity of the vertex 5 is larger than that of a pair of the side face 1 at the middle portion of the vertexes 5 which is so small as not to require correction. The rotary polygon mirror in FIGS. 3 and 4 is formed of polycarbonate and provided with triangular projections 17 only at portions in the vicinity of vertexes 5 on the upper and lower faces 2 and 3 of the hexagonal prism. For example, in the embodiment of FIGS. 3 and 4, the side face 1 where a reflecting mirror face is formed is 200 mm long, and each projection 17 is 0.3 mm high. The hexagonal prism not including the projections 17 is 4 mm high. The projection 17 can be shaped as two broken rectangles shown by reference numeral 47. The projections are preferably located axial-symmetrically.

Because of the projections 17 provided in the rotary polygonal mirror of the second embodiment, centrifugal force is generated in the projections 17 when the rotary polygon mirror is rotated. Since the centrifugal force acts as an additional centrifugal force to the portions in the vicinity of the vertexes 5 on the upper and lower faces 2 and 3 of the hexagonal prism, the amount of deformation of the upper and lower portions of the vertexes 5 close to the periphery of the upper and lower faces 2 and 3 is increased, therefore reducing the difference between the amount of deformation of the upper and lower portions and that of the central part of each vertex 5 in the heightwise direction which is positioned between the upper and lower portions. Accordingly, the vertexes 5 are less distorted. The resultant deformation or expansion 16 is shown in FIG. 4.

A rotary polygon mirror in the shape of a hexagonal prism according to a third embodiment is shown in FIGS. 5 and 6 and is useful in the case where the amount of distortion is different at each position in the peripheral direction of the side face 1, and the amount of distortion of the side face 1 in the vicinity of the vertex 5 is larger than that of the side face 1 at the middle portion between the vertexes 5, and moreover, it is necessary to correct the distortion of the side face 1 at the middle portion between the vertexes 5. There is provided a projection 27 in the whole peripheral edge of each of the upper and lower faces 2 and 3 of the rotary polygon mirror. The projection 27 is formed high at the vertex 5 and low at the middle portion between the vertexes 5. Specifically, in the embodiment of FIGS. 5 and 6, the projection 27 has 0.4 mm maximum height and 0.2 mm minimum height, and 1 mm width, for example. The higher and lower portions are continuously connected by a curved portion. The side face 1 where a reflecting mirror face is formed is 20 mm long. The height of the hexagonal prism not including the projection 27 is 4 mm. The projection 27 preferably has uniform width.

Owing to the projection 27 formed according to the third embodiment, when the rotary polygon mirror is rotated, centrifugal force acting on the projection 27 is largest for the portions in the vicinity of the vertexes 5 on the upper and lower faces 2 and 3 of the hexagonal prism, and is small at the peripheral edges of the upper and lower faces 2, 3 at the middle portion between the vertexes 5. Accordingly, the amount of deformation of the side face 1 in the vicinity of the peripheral edges of the upper and lower faces 2, 3 at the vertex 5 is increased most, whereas that of the side face 1 in the vicinity of the peripheral edges of the upper and lower faces 2, 3 at the middle portion between the vertexes 5 is increased least, so that the amount of distortion is properly reduced. The resultant deformation or expansion 26 is shown in FIG. 6.

The rotary polygon mirror of the second embodiment is compared with a conventional polygon mirror which has no projection. When both polygon mirrors are rotated at 10000 rpm, the amount of distortion of the conventional polygon mirror is 0.015 µm, but the rotary polygon mirror of the second embodiment shows the distortion reduced to 0.005 µm.

The rotary polygon mirror of the present invention can be embodied in various forms. For example, the shape of the projection can be designed freely so long as the light to the reflecting mirror face is not blocked.

As described hereinabove, the rotary polygon mirror of the present invention generates a small amount of distortion during use, so that the image accuracy of an optical mechanism of a copying apparatus, a facsimile apparatus, etc. can be improved. Moreover, a mold for the rotary polygon mirror can be formed easily without requiring a complicated curving process, and thereby the manufacturing cost is reduced.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A rotary polygon mirror comprising:

a prism having a rotary axis, an upper face, a lower face and a plurality of side faces, each of said upper and lower faces having an outer peripheral edge;

an upper projection fixed along at least part of the outer peripheral edge of said upper face;

a lower projection fixed along at least part of the outer peripheral edge of said lower face;

wherein said upper projection projects upwardly from said upper face in a direction normal to said upper face;

wherein said lower projection projects downwardly from said lower face in a direction normal to said lower face;

wherein said upper projection is axially symmetrical with respect to said lower projection;

wherein said upper projection is provided discontinuously along the outer peripheral edge of said upper face so as to define a plurality of discrete upper projection portions located at respective vertices of said upper face; and wherein said lower projection is provided discontinuously along the outer peripheral edge of said lower face so as to define a plurality of discrete lower projection portions located at respective vertices of said lower face.

2. A rotary polygon mirror as recited in claim 1, wherein said upper projection portions are all of the same height and configuration; and said lower projection portions are all of the same height and configuration.

3. A rotary polygon mirror comprising:

a prism having a rotary axis, an upper face, a lower face and a plurality of side faces, each of said upper and lower faces having an outer peripheral edge;

an upper projection fixed along the outer peripheral edge of said upper face;

a lower projection fixed along the outer peripheral edge of said lower face;

wherein said upper projection projects upwardly from said upper face in a direction normal to said upper face;

wherein said lower projection projects downwardly from said lower face in a direction normal to said lower face;

wherein said upper projection is axially symmetrical with respect to said lower projection; and wherein said upper projection is provided discontinuously along the outer peripheral edge of said upper face so as to define a plurality of discrete upper projection portions located at respective vertices of said upper face, and said lower projection is provided discontinuously along the outer peripheral edge of said lower face so as to define a plurality of discrete lower projection portions located at respective vertices of said lower face, such that said upper and lower projections together constitute a means for increasing centrifugal force which acts on said side faces at locations adjacent the respective vertices of the prism upon rotation of said prism about said rotary axis, in order to enhance uniformity, along an axial direction and in a direction about the outer periphery of the prism, of an amount of deformation of said side faces caused by centrifugal force.

4. A rotary polygon mirror as recited in claim 3, wherein said upper projection portions are all of the same height and configuration; and said lower projection portions are all of the same height and configuration.

* * * * *

UNITED STATES PATENT AND TRADEMARK OFFICE
CERTIFICATE OF CORRECTION

PATENT NO.   :   5,650,870
DATED        :   July 22, 1997
INVENTOR(S)  :   Kazuyuki KAINO et al.

It is certified that error appears in the above-identified patent and that said Letters Patent is hereby corrected as shown below:

On the title page,

Item "[73]" should read as:

--Assignee: Matsushita Electric Industrial Co., Ltd., Osaka-fu, Japan--.

Signed and Sealed this

Twelfth Day of May, 1998

Attest:

BRUCE LEHMAN

Attesting Officer           Commissioner of Patents and Trademarks